US008533294B2

(12) United States Patent
Sun

(10) Patent No.: US 8,533,294 B2
(45) Date of Patent: Sep. 10, 2013

(54) TERMINAL DEVICE AND CONTENT DATA PROCESSING METHOD

(75) Inventor: Kang Sun, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 35 days.

(21) Appl. No.: 12/629,271

(22) Filed: Dec. 2, 2009

(65) Prior Publication Data

US 2010/0161763 A1  Jun. 24, 2010

(30) Foreign Application Priority Data

Dec. 19, 2008  (JP) .................................. 2008-324253

(51) Int. Cl.
*G06F 15/16* (2006.01)

(52) U.S. Cl.
USPC ........................................................ 709/219

(58) Field of Classification Search
USPC .............. 709/219, 217, 231–232; 455/414.1, 455/414.2, 414.3, 456.2
See application file for complete search history.

(56) References Cited

U.S. PATENT DOCUMENTS

| 7,502,344 | B2 * | 3/2009 | Matsumoto | .................... 370/328 |
| 2005/0210145 | A1 | 9/2005 | Kim et al. | |
| 2007/0027949 | A1 * | 2/2007 | Park et al. | ..................... 709/203 |
| 2007/0150930 | A1 * | 6/2007 | Koivisto et al. | ............... 725/134 |
| 2008/0250061 | A1 * | 10/2008 | Kim | ......................... 707/103 R |

FOREIGN PATENT DOCUMENTS

| CN | 1901722 A | 1/2007 |
| EP | 1 936 989 A1 | 6/2008 |
| JP | 2007-66472 | 3/2007 |
| WO | WO 2007/075201 A1 | 7/2007 |

OTHER PUBLICATIONS

Office Action issued Sep. 22, 2010, in Japan Patent Application No. 2008-324253.
Office Action issued Oct. 11, 2012 in Chinese Application No. 200910260849.1.
Chinese Office Action issued Feb. 22, 2013 in Patent Application No. 200910260849.1.
Chinese Office Action issued Apr. 26, 2012, in Patent Application No. 200910260849.1.

* cited by examiner

*Primary Examiner* — Ruolei Zong
(74) *Attorney, Agent, or Firm* — Oblon, Spivak, McClelland, Maier & Neustadt, L.L.P.

(57) ABSTRACT

A terminal device includes a communication section configured to communicate with a server including content data, a reproduction processor configured to reproduce the content data obtained through the communication, a bookmark creator configured to, in accordance with an instruction from a user, create a bookmark on the basis of information regarding a reproduction location of the content data in the process of being reproduced and information regarding a storage location of the content data, a bookmark storage section configured to store the bookmark therein, and a controller configured to, in the case where an instruction for reading out the bookmark is issued by the user, perform control to read out the bookmark from the bookmark storage section, transmit a request for acquisition of the content data specified by description of the read-out bookmark to the server, and cause the reproduction processor to reproduce the content data transmitted by the server.

10 Claims, 9 Drawing Sheets

FIG. 8

```
<DMS_UDN>4545AE00-746E-48f2-9D39-6705E91F3C0D</DMS_DUN>
<BookMark_StartTime>00:05:07</BookMark_StartTime>
<BookMark_EndTime>00:08:00</BookMark_EndTime>
<UserComment>Most wonderful part</UserComment>
<item id="00000000000000021" parentID="00000000000000008" restricted="1">
    <dc:title>I-have-a-dream</dc:title>
    <upup:class>object. item. audioItem. musicTrack</upup:class>
    <dc:creator>-Unknown-</dc:creator>
    <upup:storageMedium>UNKNOWN</upup:storageMedium>
    <dc:date>2008-05-13</dc:date>
    <upup:writeStatus>UNKNOWN</upup:writeStatus>
    <res protocol Info="http-get:*:audio/mpeg:*" importUri="http://10.158.105.162:59890/MediaServerContent_0/1/00000000000000021/">http://10.158.105.162:59890/I-have-a-dream.mp3</res>
</item>
```

TERMINAL DEVICE AND CONTENT DATA PROCESSING METHOD

BACKGROUND OF THE INVENTION

1. Field of the Invention

The present invention relates to a terminal device, which is suitable for application as a terminal device configured to be connected to, for example, servers existing on networks, and has a function of transmitting and receiving content data to/from the servers. Further, the present invention relates to a content data processing method which is applied to the terminal device.

2. Description of the Related Art

Nowadays, terminal devices, such as a mobile telephone terminal and a communication terminal, are often made to store various kinds of content data therein, such as music data and image data, has become increasingly popular. Carrying around such a terminal device while out of the house or the like enables a user of the terminal device to select and reproduce a piece of content data, corresponding to a content the user desires to watch and/or listen to, from among the content data stored therein, and enjoy the content, resulting from reproduction of the piece of content data, anywhere, anytime, in any situation and the like the user likes.

Under such conditions in which users select and watch and/or listen to contents from among content data stored in their mobile terminals that they are carrying around, sometimes, cases, in which users have to halt reproduction of content data in the middle thereof, occur. In such a case, whenever a user desires to resume reproduction of content data, it is preferable to enable the user to resume reproduction of the content data from the position at which reproduction of the content data was previously halted.

Further, these days, a mechanism, which allows a server to be connected to a network and store blocks of content data, and terminal devices to each acquire a piece of content data from among the blocks of content data stored in the server through communication with the server and reproduce the acquired piece of content data, has been realized. In general, a storage capacity of a server is significantly larger than that of a memory section included in a terminal device. Therefore, a mechanism allowing servers to each store a large amount of content data therein and terminal devices to each acquire any pieces of content data from among the content data stored in the servers through communication with the servers enables users to reproduce an amount of content data larger than an amount of content data each terminal device is capable of storing therein.

As a technical standard which enables realization of such a mechanism, for example, the digital living network alliance (DLNA) standard is well known to those skilled in the art. Utilization of devices conforming to the DLNA standard enables users to acquire various kinds of contents, such as pictures, music, and images, from servers, and watch and/or listen to the acquired contents.

However, in such a case where content data is stored in servers connected to a network, in order to resume reproduction of content data from the position at which reproduction was previously halted, users have to perform various kinds of operations.

For example, in the case where there exist a plurality of servers, which are destinations of the storage of content data, firstly, it is necessary for a user to perform processes of searching for a server in which a piece of content data targeted for reproduction is stored. Even after the server has been found, subsequently, it is necessary for the user to search for a location in the server where the piece of content data targeted for reproduction is stored, and further thereto, find a position from which the user desires to resume reproduction of the content data by performing rewinding and fast-forwarding operations and the like. That is, such a case where content data is stored in servers connected to a network leads to a disadvantage in that it takes a large amount of time and trouble for a user to achieve resumption of reproducing content data from a certain position thereof from which the user desires to continuously watch and/or listen to the content.

As a method to overcome such a disadvantage, for example, in Japanese Unexamined Patent Application Publication No. 2007-66472, a technology, which enables a user using a network player configured to reproduce content data stored in servers to easily resume reproduction of music from a position at which reproduction was previously halted, is described.

SUMMARY OF THE INVENTION

In the case where reproduction of a certain piece of music is halted in accordance with a halting operation performed by a user, or the like, a technology described in Japanese Unexamined Patent Application Publication No. 2007-66472 enables resumption of reproduction of the piece of music from a position at which reproduction was previously halted. However, positions from which users desire to resume reproduction of content data are not limited to only positions at which reproduction was previously halted. For example, situations, in which users desire to resume or start reproduction of content data from, for example, any positions of video content data where their favorite scenes appear, or any positions of music content data where their favorite melodies are included, are likely to occur.

However, the existing technology described in Japanese Unexamined Patent Application Publication No. 2007-66472 has a disadvantage in that it is difficult to realize reproduction of content data from such any positions thereof users like.

Accordingly, it is desirable to provide a terminal device capable of acquiring content data from servers by communicating with the servers, in which reproduction of content data from any positions thereof users like is easily achieved.

A terminal device according to an embodiment of the present invention includes a communication section configured to perform communication with a server in which content data is stored, and a reproduction processor configured to reproduce the content data obtained through the communication made by the communication section. Further, the terminal device according to an embodiment of the present invention includes a bookmark creator configured to, in accordance with an instruction issued by a user, create a bookmark on the basis of information associated with a reproduction location of the content data in the process of being reproduced by the reproduction processer and information associated with a storage location of the content data, and a bookmark storage section configured to store therein the bookmark created by the bookmark creator. Further, in the case where an instruction for reading out the bookmark is issued by the user, the bookmark, for which reading out has been instructed, is read out from the bookmark storage section. Further, a request for acquisition of the content data specified by the content of description included in the read-out bookmark is transmitted to the server through the communication section. Further thereto, the content data which is transmitted from the server is reproduced by the reproduction processor.

By providing such a configuration as described above, in the case where an instruction is issued by a user, in accordance with the instruction, information associated with reproduction position of the content data at the timing when the instruction was issued is stored as a bookmark.

Further, in the case where an instruction for reading out the bookmark is issued by the user, content data specified by the content of description included in the read-out bookmark is acquired from the server, and the acquired content data is reproduced inside the terminal device.

According to an embodiment of the present invention, information associated with any reproduction location of content data, which is determined in accordance with an instruction made by a user, is registered as a bookmark, and on the basis of information described in the bookmark, the content data is acquired from the server, and the content data is reproduced from a position determined by the information associated with the reproduction location of the content data, which is described in the bookmark.

BRIEF DESCRIPTION OF THE DRAWINGS

FIG. 8 is a diagram illustrating an example of a description included in a bookmark, according to an embodiment of the present invention;

DESCRIPTION OF THE PREFERRED EMBODIMENTS

Hereinafter, an embodiment according to the present invention will be described with reference to accompanying drawings. In this embodiment, a terminal device according to the present invention is applied to a mobile telephone terminal. This embodiment will be described in the following order:
1. An outline of a system
2. An example of a configuration of a mobile telephone terminal
3. An example of processing for creating a bookmark
4. An example of processing for reading out a bookmark <1. An Outline of a System>

Figure 1:
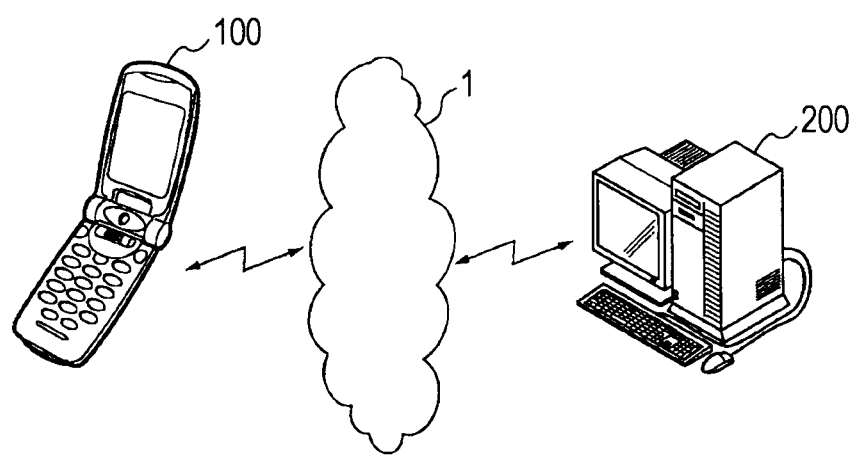
FIG. 1 is a schematic diagram illustrating an outline of a configuration of a system according to an embodiment of the present invention.

FIG. 1 is a schematic diagram illustrating an example of a configuration of a system according to this embodiment. The system according to this embodiment, shown in FIG. 1, is established on the basis of the DLNA standard, and includes a home network 1, and mobile telephone terminals 100 and servers 200, both of which are connected to the home network 1. The home network 1 is, for example, an IP-based network, which is established so as to conform to the institute of electrical and electronics engineers (IEEE) 802.11b standard, or the like.

According to the DLNA guidelines, two kinds of elements are defined, one being a digital media server (DMS) configured to record, store and provide content data, the other one being a digital media player (DMP) configured to acquire and reproduce the content data stored in the DMS. Further, in the system shown in FIG. 1, the mobile telephone terminal 100 and the server 200 correspond to the DMP and the DMS, respectively.

Figure 2:
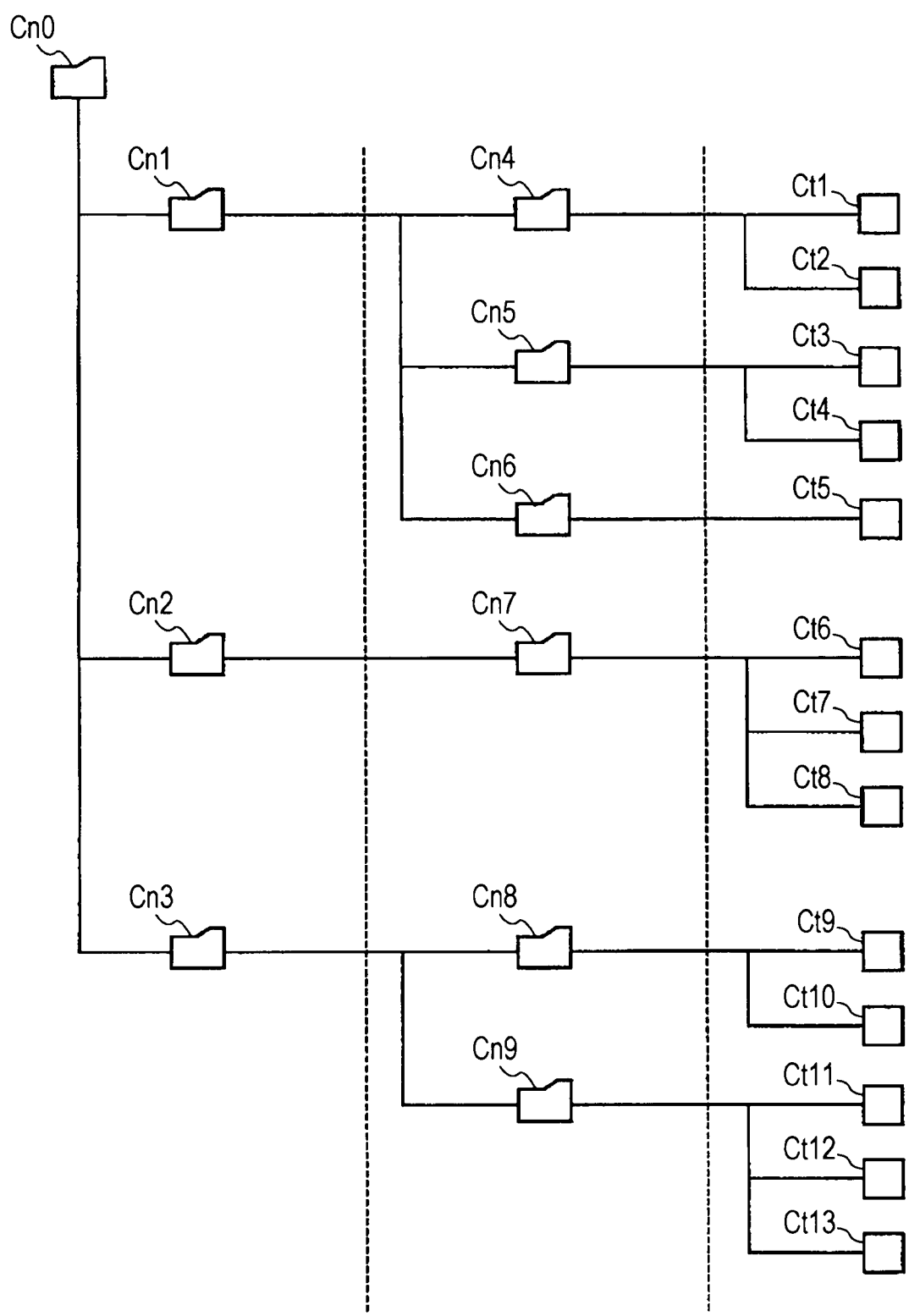
FIG. 2 is a diagram illustrating an example of a hierarchical structure of contents stored in a sever, according to an embodiment of the present invention.

In the server 200, which conforms to the DLNA standard, pieces of content data are managed in the form of a hierarchical tree structure such as the one shown in FIG. 2. Further, the server 200 is configured to hierarchize its own content data, and deliver a list and information related to the resultant hierarchical content data by using a delivery function, which is called the content directory service (CDS). This function is prescribed by a so-called UPnP AV standard, in which each piece of content data is referred to as an "item", and also, a folder configured to store the content data therein is referred to as a "container".

In the hierarchical tree structure shown in FIG. 2, under a root container Cn 0, which corresponds to the highest hierarchical level in the hierarchical tree structure, three containers are allocated, which are a music container Cn 1, a picture container Cn 2 and a video container Cn 3. Further, for example, under the music container Cn 1, three containers Cn 4 to Cn 6 are allocated, and the container Cn 4 among them includes five contents Ct 1 to Ct 5 as "items".

In order to obtain a list of containers or items included in a targeted container, firstly, the mobile telephone terminal 100 transmits a "browsing request" to the server 200. Further, the server 200 transmits information related to containers located directly below the root container Cn 0 to the mobile telephone terminal 100 as a "browsing response". That is, between the mobile telephone terminal 100 and the server 200, transmitting and receiving of the "browsing request" and the "browsing response" are iteratively performed a plurality of times until a targeted item is reached.

Further, in a step where a targeted item is finally reached, the mobile telephone terminal 100 transmits a request, such as a "HTTP GET request", for acquisition of a file to the server 200, and then, acquires the targeted content data.

<2. An Example of a Configuration of a Mobile Telephone Terminal>

Figure 3:
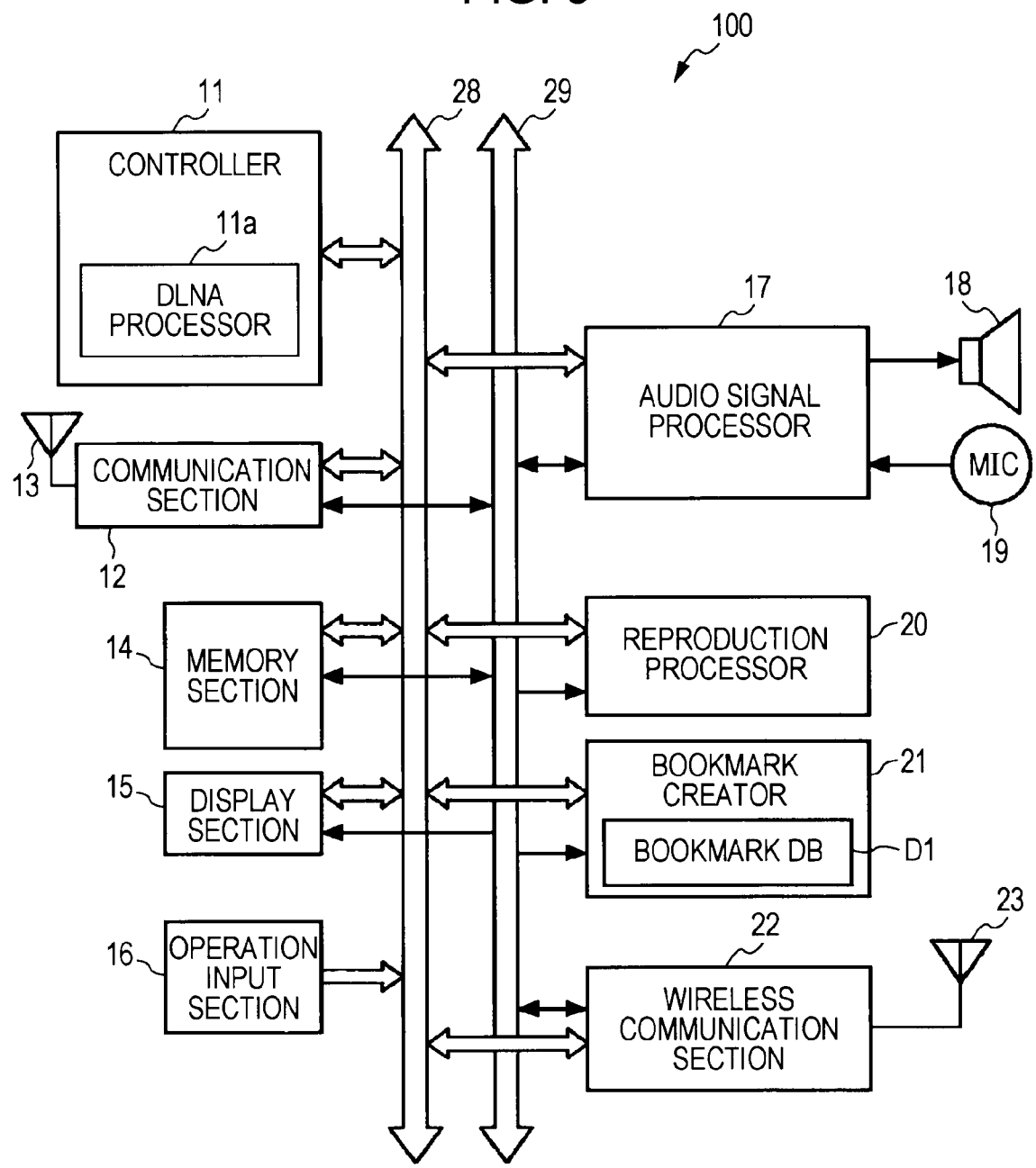
FIG. 3 is a diagram illustrating an example of a configuration of the inside of a mobile telephone terminal according to an embodiment of the present invention.

Next, an example of the internal configuration of the mobile telephone terminal 100 used in this embodiment will be described with reference to FIG. 3. As shown in FIG. 3, the mobile telephone terminal 100 includes a controller 11, which is configured to perform control of processing operations performed by individual sections inside the mobile telephone terminal 100. The controller 11 is configured to transfer control data to/from individual sections inside the terminal telephone terminal 100 via a control line 28. The controller 11 in this example includes a DLNA processer 11a therein, which is configured to perform control so as to cause content data to be transferred in accordance with the above-described DLNA standard.

The DLNA processor 11a performs processing for creating the "browsing request", the "HTTP GET request" and the like, which are transmitted to the server 200, and creating a list of contents (i.e., containers or items) on the basis of contents described in the "browsing response" transmitted from the server 200. The created list of contents is displayed on a display section 15, which will be described below, in accordance with control performed by the controller 11.

Moreover, the mobile telephone terminal 100 according to this embodiment includes a communication section 12 configured to perform wireless communication processing for a wireless telephone service, which is necessary for the mobile telephone terminal 100 to function as a wireless telephone terminal, and an antenna 13 is configured to be connected to this communication section 12. The communication section 12 is configured to perform wireless communication with a base station for a wireless telephone service, and perform bidirectional data transmission to/from the base station. The communication section 12 transfers data received from the base station side to individual sections inside the mobile telephone terminal 100 via a data line 29. Furthermore, the communication section 12 is configured to transmit data transferred from the individual sections inside the mobile telephone terminal 100 to the base station side.

Besides the communication section 12, a memory section 14, a display section 15 and an operation input section 16 are connected to the data line 29. The memory section 14 is configured to store programs therein, which are necessary for the mobile telephone terminal 100 according to this embodiment to perform operations, and further, various kinds of data which are instructed to be stored therein by users, and the like. The memory section 14 also stores therein content data related to pieces of music, images, and the like, which are acquired through downloading from the server. The display section 15 is configured to include a liquid crystal display or an organic display as a display device, and display various kinds of information in accordance with control performed by the controller 11. The operation input section 16 is configured to include dialing keys each having a numerical character, a symbol or the like indicated thereon, further, various kinds of function keys, and the like, which are necessary for operations as a telephone terminal. Pieces of operation information generated by manipulating individual keys included in the operation input section 16 are supplied to the controller 11. When users perform various kinds of setting operations, for example, operation guidance is displayed on the display section 15, and in accordance with the operation guidance, users perform input operations by using the operation input section 16, and as a result, the users can achieve appropriate settings.

Furthermore, an audio signal processor 17, a reproduction processer 20, a bookmark creating section 21 and a wireless communication section 22 are also connected to the data line 29.

The audio signal processor 17 is a processor configured to perform processing of audio signals, and a speaker 18 and a microphone 19 are connected thereto. The speaker 18 and the microphone 19 are used as a transmitter and a receiver, respectively, while telephone calls are made through the mobile telephone terminal 100 according to this embodiment. That is, audio data is supplied from the communication section 12 to the audio signal processor 17, where the audio data is demodulated and converted into analog signals, further, is subjected to analog processing such as amplification, and then, the resultant audio signals are outputted from the speaker 18. Further, audio signals collected by the microphone 19 are modulated and converted into digital audio data by the audio signal processor 17, further, the modulated audio data is supplied to the communication section 12, and then, is wirelessly transmitted or the like.

The reproduction processor 20 is a processor configured to reproduce music data and image data acquired from the server 200 via communication therewith. The bookmark creating section 21 is configured to, once an instruction for creating a bookmark is inputted by a user, instruct the DLNA processor 11a to create a "browsing request". That is, the reproduction processor 20 performs processing for acquiring information (meta data) related to contents from the server 200, each of the contents being a content in the process of being reproduced at the timing when the instruction for creating a bookmark was inputted by a user.

Further, the bookmark creating section 21 is configured to, upon receipt of the meta data related to the targeted content, which has been transmitted from the server 200, describe information included in the meta data as a bookmark, and record the information in a bookmark data base (which will be hereinafter referred to as DB) D1. The description of the bookmark will be described below in detail.

The wireless communication section 22 is configured to be connected to an antenna 23 which transmits and receives radio signals. The wireless communication section 22 is used when wireless communication with the server 200 is performed via the home network 1 shown in FIG. 1.

<3. An Example of Processing for Creating a Bookmark>

Figure 4:
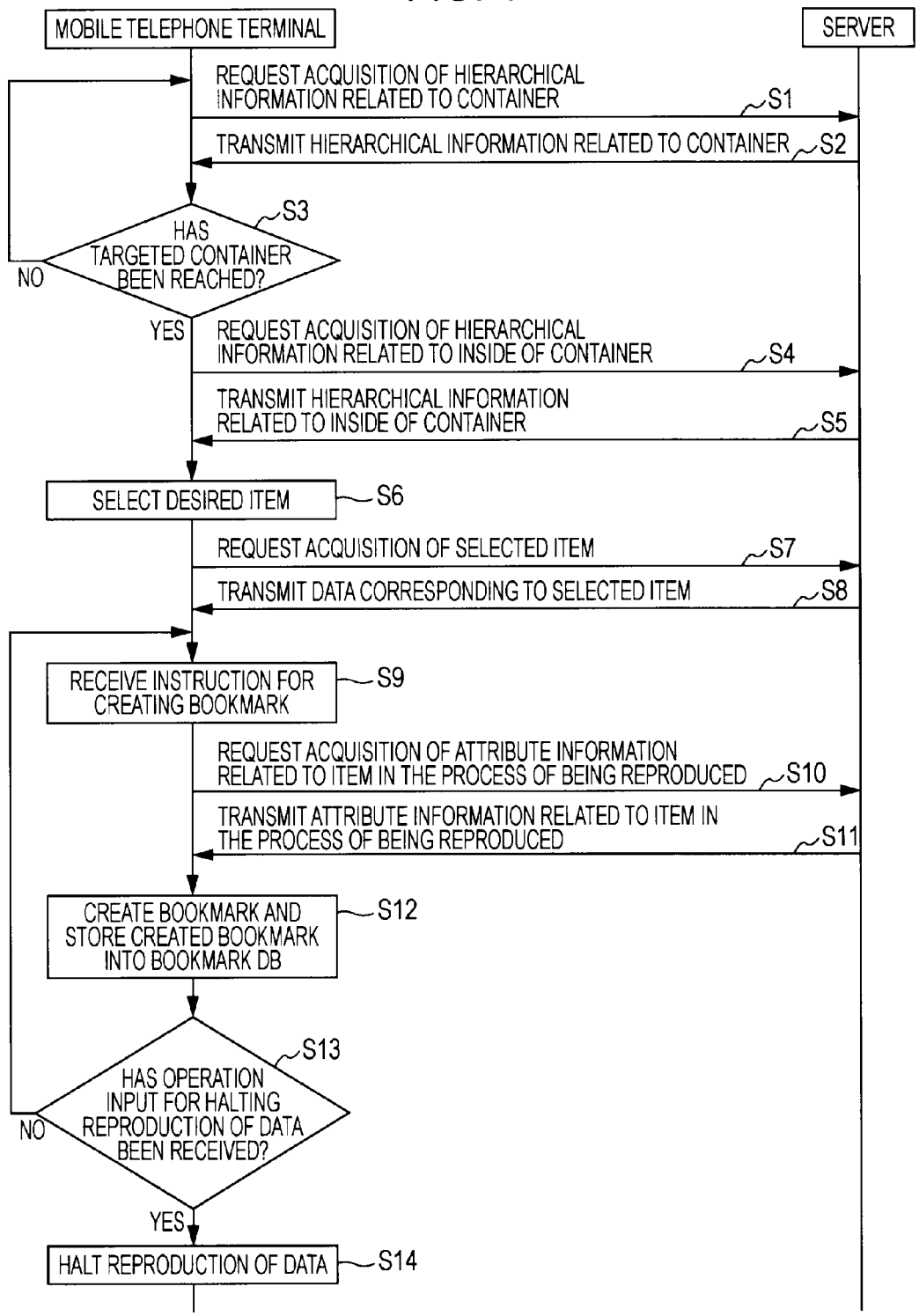
FIG. 4 is a diagram illustrating a sequence flowchart of processing for creating a bookmark, according to an embodiment of the present invention.

Next, an example of processing for creating a bookmark, which is performed by the above-described mobile telephone terminal 100, will be described with reference to a flowchart shown in FIG. 4. The processing shown in FIG. 4 is performed subsequent to receipt of an operation input from a user, instructing reproduction of a content the user desires to reproduce. Firstly, once a request for acquisition of hierarchical information related to a container is transmitted as a "browsing request" from the mobile telephone terminal 100 to the server 200 (in step S1), the requested hierarchical information related to the container is sent back to the mobile telephone terminal 100 from the server 200 by using a "browsing response" (in step S2).

Subsequently, it is determined whether the desired container has been reached, or not (in step S3), and in the case where the desired container has not yet been reached, the flow of processing returns to step S1, and then, processes to be performed in steps S1 to S3 are repeated. That is, until completion of acquisition of information related to a targeted container including the content (item) the user desires to reproduce, the processes of transmitting the "browsing request" and receiving the "browsing response" are iterated between the mobile telephone terminal 100 and the server 200.

In step S3, in the case where it is determined that the targeted container has been reached, a request for acquisition of hierarchical information related to items included in the targeted container is transmitted from the mobile telephone terminal 100 to the server 200 by using a "browsing request" (in step S4). Further, the requested hierarchical information related to the items included in the targeted container is transmitted from the server 200 by using a "browsing response" (in step S5).

Next, once an input operation of selecting a desired item is performed by the user (in step S6), a request for acquisition of the selected item is transmitted as a "HTTP GET request" from the mobile telephone terminal 100 to the server 200 (in step S7). In the server 200, the desired item is extracted from the content of the "HTTP GET request", and content data corresponding to the desired item is transmitted to the mobile telephone terminal 100 (in step S8). In the mobile telephone terminal 100, which has received the content data, processing for reproduction of the content data is performed by the reproduction processer 20 (refer to FIG. 3), and then, the resultant reproduced content is displayed on the display section 15.

Once an instruction for creating a bookmark is inputted by the user while the content is being reproduced (in step S9), a request for acquisition of attribute information related to the item in the process of being reproduced is transmitted as a "browsing request" from the mobile telephone terminal 100 to the server 200 (in step S10). Further, the attribute information related to the item is transmitted from the server 200 to the mobile telephone terminal 100 by using a "browsing response" (in step S11).

Upon receipt of the requested attribute information related to the item, the mobile telephone terminal 100 creates a bookmark on the basis of both the received attribute information, and position information related to the item at the timing when the instruction for creating the bookmark was inputted by the user, and stores the created bookmark in the bookmark DB D1 (in step S12). Subsequently, upon receipt of an operation input from the user, it is determined whether the operation input is an instruction for halting reproduction of the content, or not (in step S13), and in the case where the operation input from the user is not an instruction for halting reproduction of the item, but an instruction for performing fast-forwarding, temporary stopping or the like, the corresponding control is performed. In the case where the operation input from the user is an instruction for halting reproduction of the content, processing for halting reproduction of the content is performed (in step S14).

Figure 5:
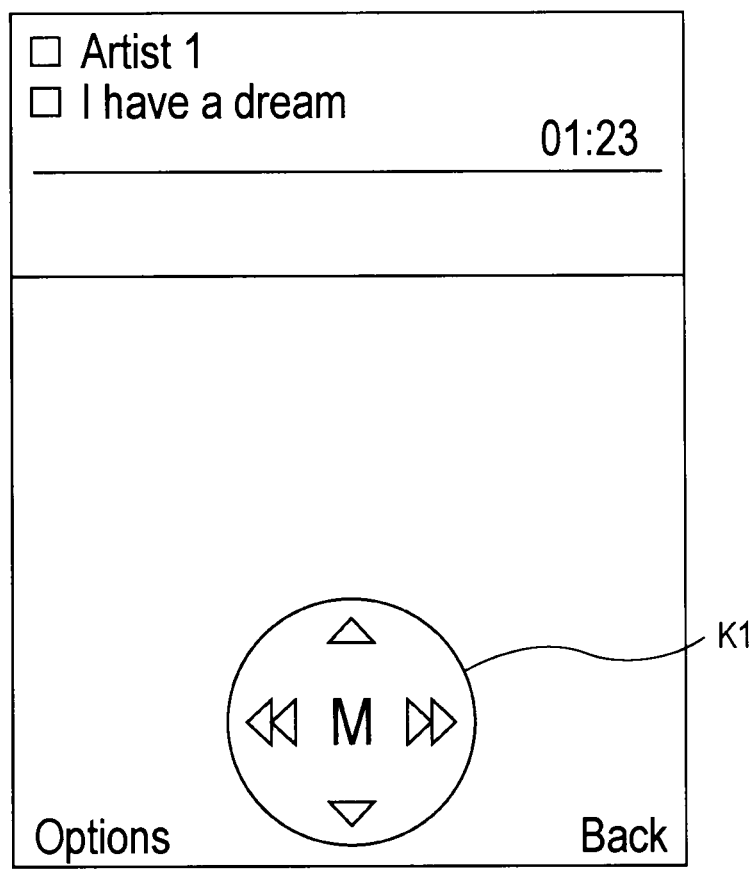
FIG. 5 is a diagram illustrating an example of a configuration of a display screen for creating bookmarks, according to an embodiment of the present invention.

As a user interface (UI) used for creating a bookmark, such a display screen as shown in FIG. 5 is configured to be displayed on the display section 15. The display screen shown in FIG. 5 is an example in the case where music data is in the process of being reproduced as a content. In the upper area of the display screen, as pieces of attribute information, an artist name and a title of the music, such as "Artist 1" and "I have a dream", are indicated, respectively. Further, a piece of information representing a current reproduction position, such as "01:23", is indicated.

In the bottom area of the display screen, a circular operation key having a character "M" indicated on the center portion thereof is provided, and processing is configured so that pushing down the center portion denoted by the character "M" twice causes instruction of creation of a bookmark.

Figure 6:
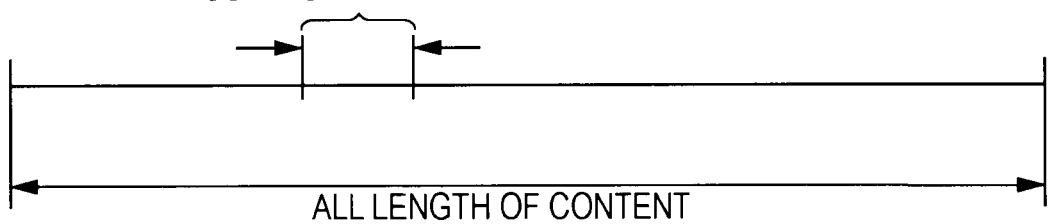
FIG. 6 is a diagram illustrating an example of creation of a bookmark including a certain duration, according to an embodiment of the present invention.

Furthermore, in this example, as a bookmark, it is possible to retain not only a piece of information related to a specific reproduction position, but also a piece of information related to a duration of a certain length. That is, as shown in FIG. 6, a piece of information related to a duration, in which a user is particularly interested, in the all length of a content is extracted, and on the basis of the extracted information, it is possible to create a bookmark including a piece of information corresponding to the duration.

Figure 7A:
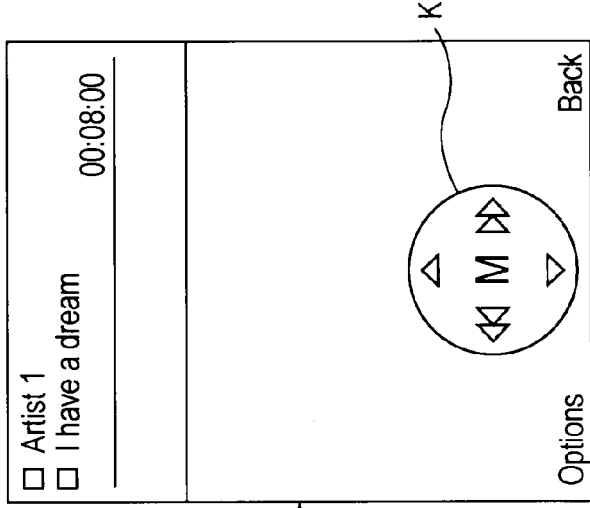
FIGS. 7A, 7B and 7C are diagrams each illustrating an example of a transition of a bookmark creating display screen, according to an embodiment of the present invention.
Figure 7B:
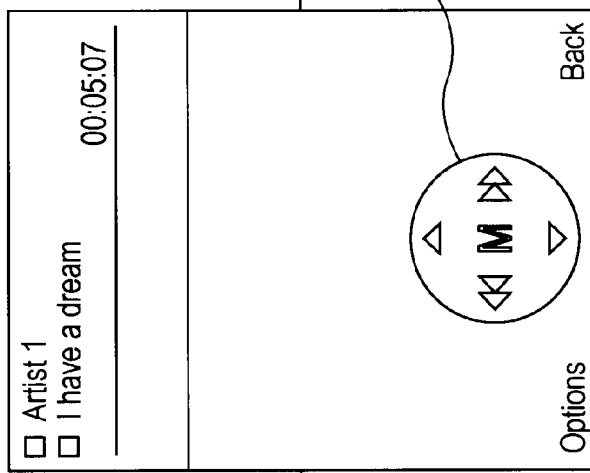
Figure 7C:
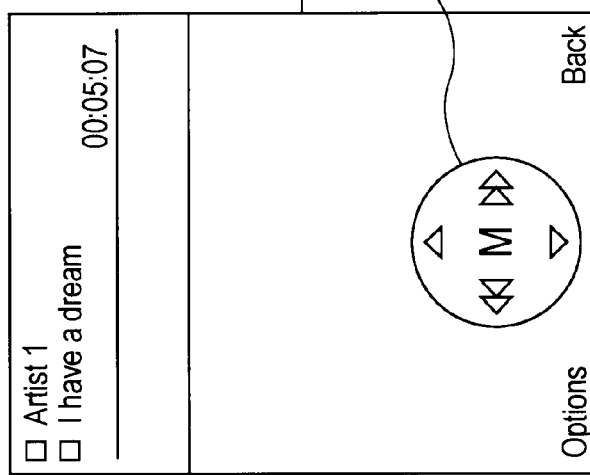

FIGS. 7A, 7B and 7C are diagrams each illustrating an example of a transition of a bookmark creating display screen in the case where a piece of information corresponding to a specific duration is registered as a bookmark. On a display screen, shown in FIG. 7A, under a condition in which a content is in the process of being reproduced, once the center portion "M" of the key is pushed down just one time, on the basis of the operation input, information indicating a reproduction start position of the content is obtained as a piece of information to be registered as a bookmark. Further, while reception of a subsequent operation for creating the bookmark is being awaited, in order to allow the user to easily recognize this fact, indication of the center portion "M" is changed as shown in an example of FIG. 7B. In the example shown in FIG. 7B, the character "M" is indicated by using an outline character. Alternatively, an indication color thereof may be changed, or a blinking operation thereof may be performed.

Further, on a display screen shown in FIG. 7C, once the center portion "M" is pushed down once again by the user, a piece of information indicating a reproduction end position of the content is obtained. That is, in the example shown FIGS. 7A to 7C, a duration from a time-position indicated by 00:05:07 (i.e., five minutes and seven seconds) to a time-position indicated by 00:08:00 (i.e., eight minutes) of the content is registered as the bookmark. In addition, a plurality of bookmarks, each being created in such a manner, can be registered for each content.

Next, an example of a description included in a bookmark will be described with reference to FIG. 8. In a created bookmark in an example shown in FIG. 8, specific ID information allocated to the server 200, which is denoted by "DMS_UDN", is described on the first line of the bookmark. This information is used to specify the location of a server existing on the home network 1, the server storing items therein, to which each of bookmarks having been created in such a manner as described above is attached.

Further, a bookmark also has pieces of information corresponding to time-positions including a reproduction start position and a reproduction end position, which are denoted by "BookMark_StartTime" and "BookMark_EndTime", respectively. In the case where only a certain reproduction position is specified by a user, that is, in the case where a piece of information corresponding to a position having no length of time extending therefrom is specified by a user, a time-position denoted by the "BookMark_StartTime" is the same as a time-position denoted by the "BookMark_EndTime".

On the next below line of the bookmark, there is an item denoted by "User Comment". This "User Comment" is a comment written by a user, and an arbitrary character string can be registered as this comment. By allowing the user to attach an arbitrary comment to a bookmark the user has instructed to create, in the case where, afterward, the user has to read out the bookmark, it is possible for the user to search for the desired bookmark by using this comment as a key for searching. In the example shown in FIG. 8, a comment denoted by "Most Wonderful Part" has been registered as the "User Comment".

Further, in the bookmark, pieces of attribute information related to an item are described. In the example shown in FIG. 8, an ID of the item (item id), an ID of a container storing the item therein (parent id), a title of the item (dc: title), a piece of information indicating a location where the item is stored (importUri), and the like, are described. These pieces of attribute information related to the item are those transmitted from the server 200 in step S11 of the flowchart shown in FIG. 4.

<4. An Example of Processing for Reading Out a Bookmark>

Figure 9:
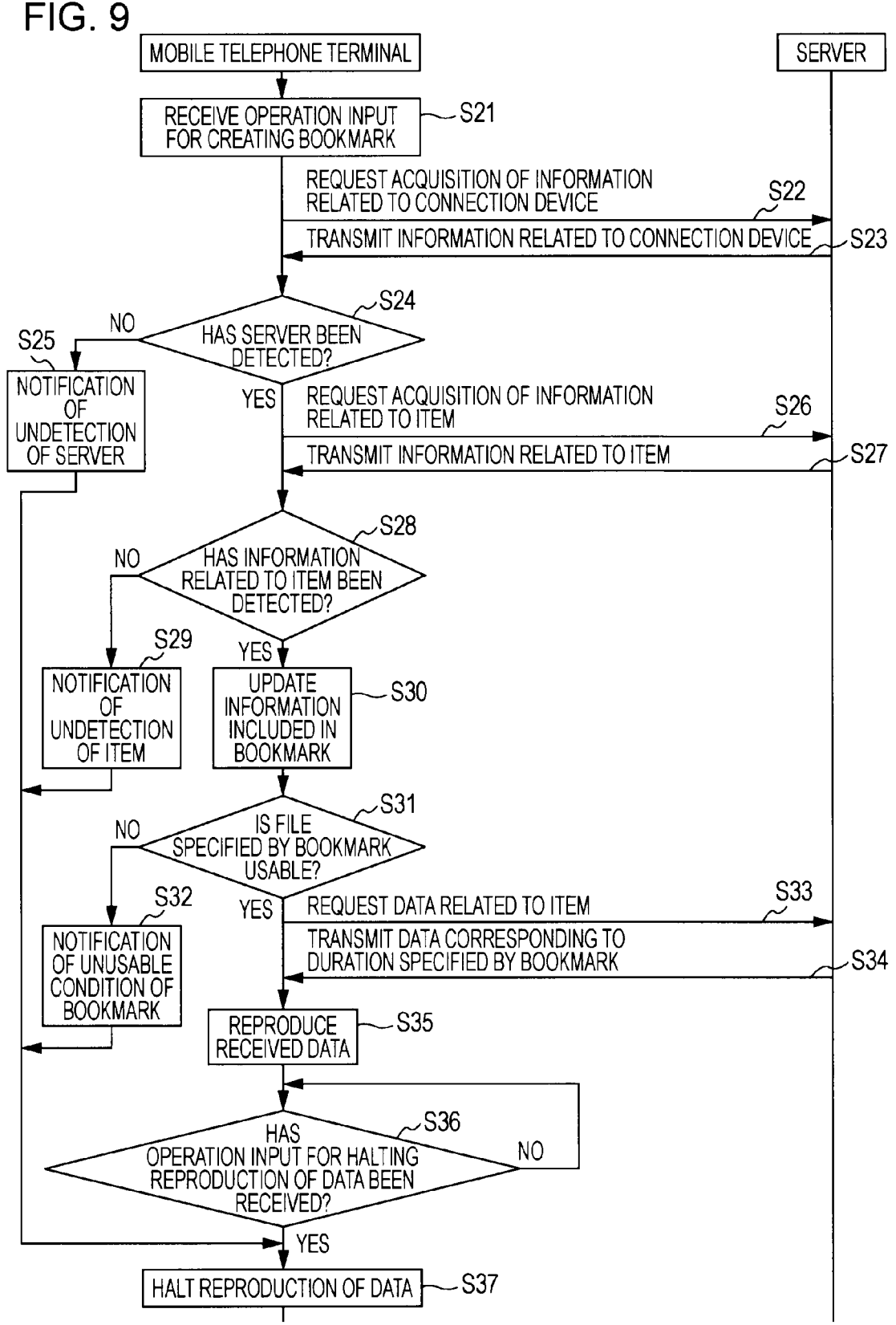
FIG. 9 is a diagram illustrating an example of a sequence flowchart of reproduction processing using a bookmark, according to an embodiment of the present invention.

Next, processes of reading out a bookmark performed by the mobile telephone terminal 100 and the server 200 will be described with reference to a flowchart shown in FIG. 9. Processes shown in FIG. 9 are those to be performed after a request for display of a list of bookmarks was inputted by a user, further, in accordance with the request, the list of bookmarks was read out from the bookmark DB D1, and has been displayed on the display section 15.

Firstly, once a certain bookmark is selected by a user through the operation input section 16 (in step S21), a request in accordance with "M-search" method is transmitted from the mobile telephone terminal 100 to all servers existing on the home network 1 (in step S22). That is, detection of all servers existing on the home network 1 is performed by the mobile telephone terminal 100.

In step S22, from each server having received the request in accordance with the "M-search" method, allocated location information related to the server itself, a name of the server itself and the like are transmitted as connection device information (in step S23). In the mobile telephone terminal 100 having received the pieces of connection device information from servers, the pieces of connection device information from servers are compared with a piece of information related to the server 200, which is described in the bookmark having been selected. As a result of this comparison, it is determined whether the piece of information related to the server 200 exists in the received pieces of connection device information, or not. That is, it is determined whether a server described in the selected bookmark has been detected on the home network 1, or not (in step S24).

In the case where it is determined that the piece of information related to the server 200 does not exist in the received pieces of connection device information, the mobile telephone terminal 100 notifies the user of the result, through the display section 15, in which the server 200 has not been detected (in step S25), and then, the flow of proceeding terminates. In the case where the piece of information related to the server 200 has been extracted from among the received pieces of connection device information, subsequently, on the basis of the content of description included in the bookmark, a request for acquisition of information related to an item described in the bookmark the user selected is transmitted to the server 200 as a "searching request" (in step S26). Further, from the server 200 to the mobile telephone terminal 100, attribute information related to the item, which was described in the "searching request", is transmitted as a "searching response" (in Step S27). In addition, in the case where no piece of information corresponding to the item having been described in the "searching request" has not been detected at the server 200 side due to previously performed deletion of the item or the like, a notification indicating that the item has not been detected is transmitted to the mobile telephone terminal 100 as a "searching response".

On the basis of the content of the "searching response", which was received in step S27, the mobile telephone terminal 100 determines whether a piece of information corresponding to the item has been detected in the server 200, or not, (in step S28). In the case where it is determined that the piece of information corresponding to the item has not been detected in the server 200, a notification indicating undetection of the item is transferred to the display section 15 and the like (in step S29), and then, the flow of processing terminates.

In the case where it is determined that the piece of information corresponding to the item has been detected in the server 200, on the basis of the piece of attribute information related to the item having been transmitted from the server 200 in step S27, a piece of information related to the bookmark is updated (in step S30). That is, at this timing, the piece of information related to the bookmark, which has been registered in the bookmark DB D1 included in the mobile telephone terminal 100, is updated into the latest information.

Subsequently, the mobile telephone terminal 100 determines whether a file (content data) specified by the content of description included in the bookmark is valid, or not (in step S31), and in the case where the file specified by the content of description included in the bookmark is invalid, the unusable condition of the bookmark is notified to the user through the display section 15 or the like (in step S32). Further, at this timing, the flow of processing terminates. In the case where the file specified by the content of description included in the bookmark is valid, subsequently, a request for transmission of content data related to the item is made by using a "HTTP GET request" (in step S33). Further, it is assumed that description of this "HTTP GET request includes pieces of information indicating a reproduction start position and a reproduction end position of the item.

In the server 200, content data corresponding to the item which is requested by description included in the "HTTP GET request" is read out, and then, the read-out content data is transmitted to the mobile telephone terminal 100 (in step S34). Further, the received content data is reproduced by the mobile telephone terminal 100 (in step S35). That is, as a result, here, a part of content data, corresponding to only a duration from the reproduction start position until the reproduction end position, is reproduced.

Further, upon receipt of an operation input from the user, it is determined whether the operation input is an instruction for halting reproduction of the content, or not (in step S36), and in the case where the operation input from the user is not an instruction for halting reproduction of the item, but an instruction for performing fast-forwarding, temporary stopping or the like, the corresponding control is performed. In the case where the operation input from the user is an instruction for halting reproduction of the content, processing for halting reproduction of the content is performed (in step S37).

Figure 10A:
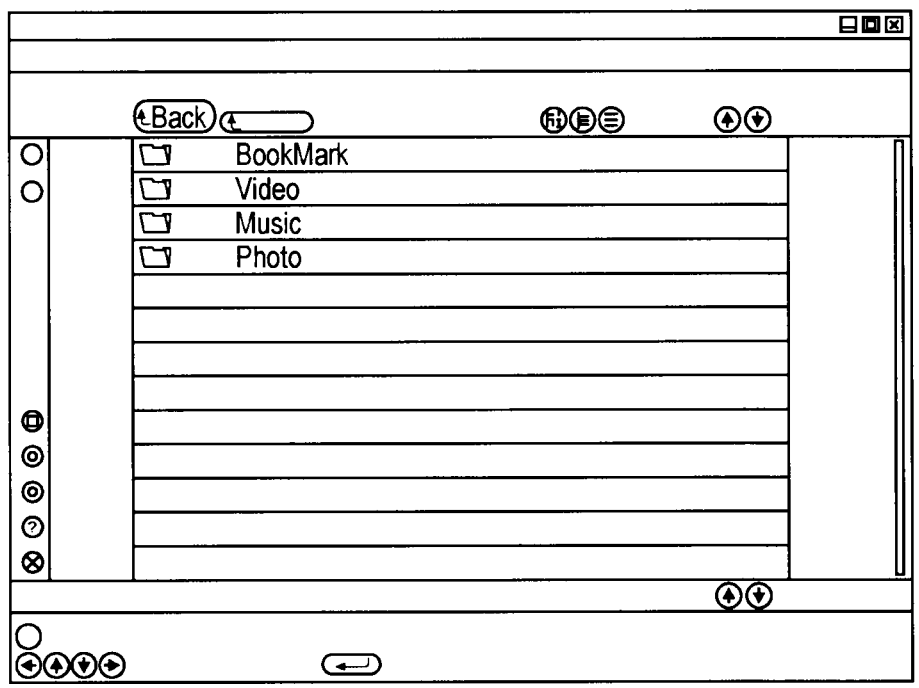
FIGS. 10A and 10B are diagrams each illustrating an example of a configuration of a bookmark selecting display screen, according to an embodiment of the present invention.

Next, an example of a display screen used for selecting a bookmark will be described with reference to FIG. 10. FIG. 10A is a diagram illustrating a display screen in the condition where various kinds of containers stored in the server 200 are displayed in the form of a list. On this display screen, characters of "Video" representing the container Cn 3, which stores image contents therein, and characters of "Music" representing the container Cn 1, which stores music contents therein, are displayed together with characters of "Book-Mark".

Figure 10B:
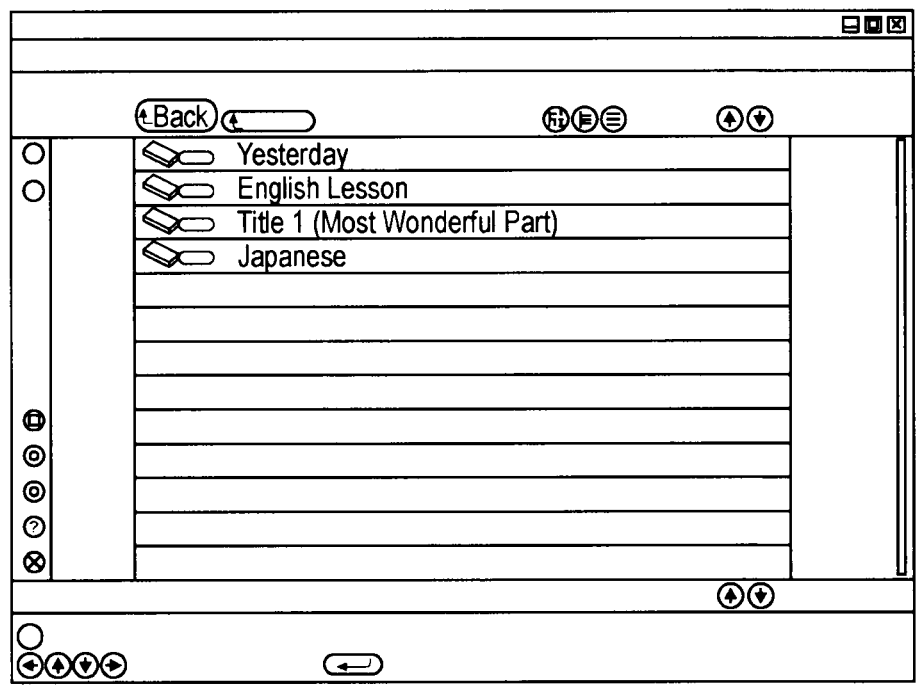

By selecting the item "BookMark", users are able to confirm a list of bookmarks. An example of the list of bookmarks is shown in FIG. 10B. In FIG. 10B, titles corresponding to respective bookmarks are displayed, the titles being "Yesterday", "English Lesson", "Title 1", and "Japanese". It is assumed that such titles indicated on the display screen are made to correspond to respective pieces of title information, but, it is also possible to indicate comments each having been added to a bookmark by a user when the user created the bookmark. In the example shown in FIG. 10B, the part in brackets of "Title 1 (Most Wonderful Part)" represents a comment having been added by a user.

Advantages Resulting from the Embodiment

The mobile telephone terminal 100 according to the forgoing embodiment, which has a function of reproducing content data acquired from the server 200 existing on a network which is established so as to conform to the DLNA standard or the like, enables users to easily register thereinto pieces of information related to any reproduction positions and/or any reproduction durations the users like for each piece of content data as bookmarks.

Further, the mobile telephone terminal 100 according to the forgoing embodiment enables registration of not only pieces of information related to specific reproduction positions, but also pieces of information related to durations, each including pieces of information indicating a reproduction start position and a reproduction end position, for each piece of content data, and thus, enables users to register favorite spoken lines in video contents, and the like, as bookmarks.

Further, the mobile telephone terminal 100 according to the forgoing embodiment enables registration of a plurality of bookmarks for each piece of content data, and thus, enables users to resister impressive parts, phrases and the like without omission thereof.

Further, the mobile telephone terminal 100 according to the forgoing embodiment causes bookmarks to each include not only pieces of information related to reproduction positions and reproduction durations for each piece of content data, but also pieces of information related to the server 200. Therefore, even when any changes in the condition of connection with the server 200 on the home network 1 occur and further, any changes in the contents of items are made, it is possible for the mobile telephone terminal 100 to perform control on the basis the latest information.

Further, according to the forgoing embodiment, the bookmark creating function and the bookmark DB D1 are implemented only at the mobile telephone terminal 100 side. Therefore, without making any changes on the server 200, the mobile telephone terminal 100 enables realization of functions of creating bookmarks, and reproducing contents on the basis of the created bookmarks.

In addition, in this embodiment which has been described so far, an example, in which a terminal device according to the present invention is applied to the mobile telephone terminal 100, is provided, but the present invention is not limited to this embodiment. For example, the present invention may be applied to communication terminals each having no telephone function, game machines, game players and personal computers each having a communication function, and the like.

Further, in the foregoing embodiment, an example of a specific method for requesting and responding using the "browsing request", the "HTTP GET request" and the like is provided, however, the method for requesting and responding is not limited to such a method as employed in the foregoing embodiment, but, other methods, which enable realization of functions the same as or similar to the functions realized by the method employed in the foregoing embodiment, may be employed.

Further, in the foregoing embodiment, an example, in which the home network 1 which is established so as to conform to the DLNA standard is used, but embodiments of the present invention may be realized by using networks which conform to different standards.

The present application contains subject matter related to that disclosed in Japanese Priority Patent Application JP 2008-324253 filed in the Japan Patent Office on Dec. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device, comprising:
   a communication section configured to perform communication with a server in which content data is stored;
   a reproduction processor configured to reproduce the content data obtained through the communication performed by the communication section;
   a bookmark creator configured to, in accordance with a first instruction and a second instruction issued by a user, create a bookmark defining a duration of the reproduced content on the basis of information associated with a reproduction location of the content data in the process of being reproduced by the reproduction processor and the first and second instructions issued by the user and information associated with a storage location of the content data;
   a bookmark storage section configured to store therein the bookmark created by the bookmark creator; and
   a controller configured to, in the case where an instruction for reading out the bookmark is issued by the user, perform control so as to read out the bookmark, for which reading out has been instructed by the user, from the bookmark storage section, transmit a request for acquisition of the content data specified by the content of description included in the read-out bookmark to the server through the communication section, and cause the reproduction processor to reproduce the content data which is transmitted from the server, wherein
   the bookmark includes reproduction time-position information associated with the content data, identification information associated with the server, a title of the content data, and attribute information associated with the content data, which are determined in accordance with the instruction issued by the user;
   the bookmark includes a comment section including comments corresponding to the bookmark which are entered by the user;
   the terminal device is configured to receive a keyword, and the controller is configured to search the bookmark storage section for bookmarks having comments that include words matching the keyword.

2. The terminal device according to claim 1, wherein the bookmark includes a plurality of bookmarks which are created so as to correspond to one piece of the content data.

3. The terminal device according to claim 2, wherein, in accordance with the first and second instructions issued by the user, the bookmark creator is configured to create a bookmark including information associated with a reproduction start position and a reproduction end position of the content data.

4. The terminal device according to claim 1, wherein the controller is configured to, in the case where an instruction for reading out the bookmark is issued by the user, read out the bookmark, for which reading out has been instructed by the user, from the bookmark storage section, acquire attribute information associated with the content data from the server, the content data being specified by an identifier of the server and identification information associated with the content data, which are described in the read-out bookmark, and in the case where the acquired attribute information associated with the content data is different from attribute information associated with the content data, which is described in the read-out bookmark, overwrite the acquired attribute information on attribute information stored in the bookmark storage section, which corresponds to the read-out attribute information.

5. The terminal device according to claim 4, further comprising a display section configured to display an image reproduced by the reproduction processor,
   wherein the controller is configured to, in the case where the instruction for reading out the bookmark is issued by the user, and further, acquisition of the content data from the server, which is specified by the content of description included in the read-out bookmark, has resulted in a failure, output a notification of the failure in the acquisition of the content data on the display section.

6. The terminal device according to claim 1, wherein the bookmark creator is configured to create the bookmark including information associated with a reproduction start position based on when the first instruction was issued during reproduction of the content data by the reproduction processor.

7. The terminal device according to claim 1, wherein the bookmark creator is configured to create the bookmark including information associated with a reproduction end position based on when the second instruction was issued during reproduction of the content data by the reproduction processor.

8. The terminal device according to claim 1, wherein the bookmark includes identification information corresponding to a storage folder in which the content data is stored.

9. The terminal device according to claim 1, wherein the bookmark includes information indicating where the content item is stored.

10. A content data processing method comprising:
performing communication with a server in which content data is stored;
reproducing the content data obtained through the communication;
creating a bookmark defining a duration of the reproduced content in accordance with a first instruction and a second instruction issued by a user on the basis of information associated with a reproduction location of the content data in the process of being reproduced and the first and second instructions and information associated with a storage location of the content data;
storing the bookmark; and
performing control, in the case where an instruction for reading out the bookmark is issued by the user, so as to read out the bookmark, for which reading out has been instructed by the user, transmit a request for acquisition of the content data specified by the content of description included in the read-out bookmark to the server, and reproduce the content data which is transmitted from the server, wherein
the bookmark includes reproduction time-position information associated with the content data, identification information associated with the server, a title of the content data and attribute information associated with the content data, which are determined in accordance with the instruction issued by the user;
the bookmark includes a comment section including comments corresponding to the bookmark which are entered by the user;
receiving a keyword, and searching for bookmarks having comments that include words matching the keyword.

\* \* \* \* \*